United States Patent [19]

Kanou et al.

[11] 4,342,481
[45] Aug. 3, 1982

[54] REMOVABLE ROOF EQUIPPED WITH A WIND DEFLECTOR PLATE

[75] Inventors: Noboru Kanou; Keiji Mori, both of Toyota, Japan

[73] Assignees: Toyota Jidosha Kogyo Kabushiki Kaisha; Aisin Seiki Kabushiki Kaisha, both of Japan

[21] Appl. No.: 173,607

[22] Filed: Jul. 30, 1980

[30] Foreign Application Priority Data

Aug. 16, 1979 [JP] Japan .................................. 54-103524

[51] Int. Cl.³ ............................................... B60J 7/18
[52] U.S. Cl. ...................................... 296/217; 296/218
[58] Field of Search ......................... 296/216, 217, 218

[56] References Cited

U.S. PATENT DOCUMENTS

| 4,005,901 | 2/1977 | Lutke | 296/218 |
|---|---|---|---|
| 4,067,604 | 1/1978 | Mori | 296/217 |
| 4,126,352 | 11/1978 | Vogel | 296/218 |
| 4,165,120 | 8/1979 | Jardin | 296/217 |

Primary Examiner—Joseph F. Peters, Jr.
Assistant Examiner—John A. Carroll
Attorney, Agent, or Firm—Kenyon & Kenyon

[57] ABSTRACT

A removable roof, for covering the opening formed on the roof of a motor vehicle, comprising a tongue member which extends forwards from the front end of the removable roof. The tongue member is engageable with the hole of a hollow case fixed onto the roof of a motor vehicle. A U-shaped link is rotatably mounted on the roof of a vehicle at a position beneath the removable roof and is rotatable from a substantially horizontal lying position to a standing position. The removable roof has a latch groove formed thereon and coming into engagement with the U-shaped link when the removable roof is completely closed or partially opened. An automatically standing wind deflector plate is arranged beneath the front end of the removable roof and pivotally connected to the U-shaped link. The front end of the wind deflector plate is slidably mounted on the roof of a motor vehicle.

18 Claims, 16 Drawing Figures

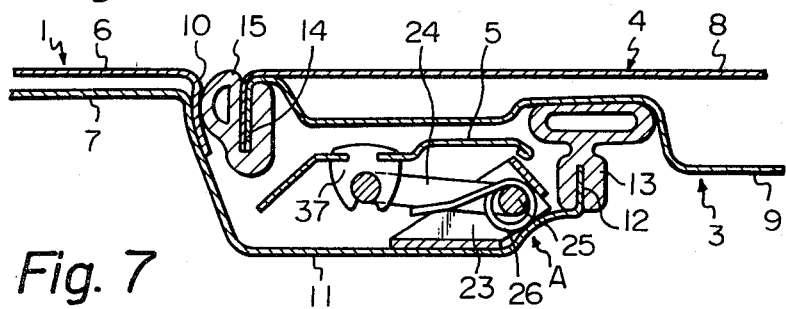
Fig. 6
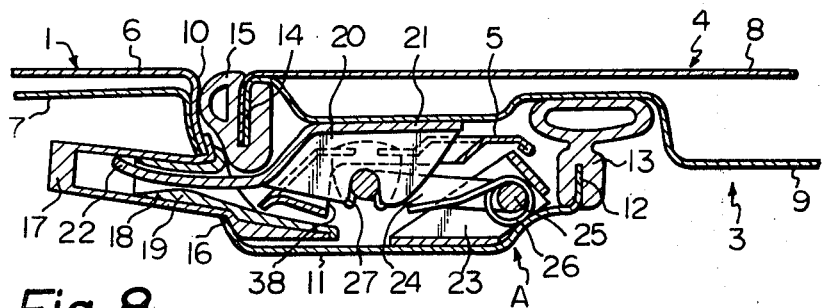
Fig. 7
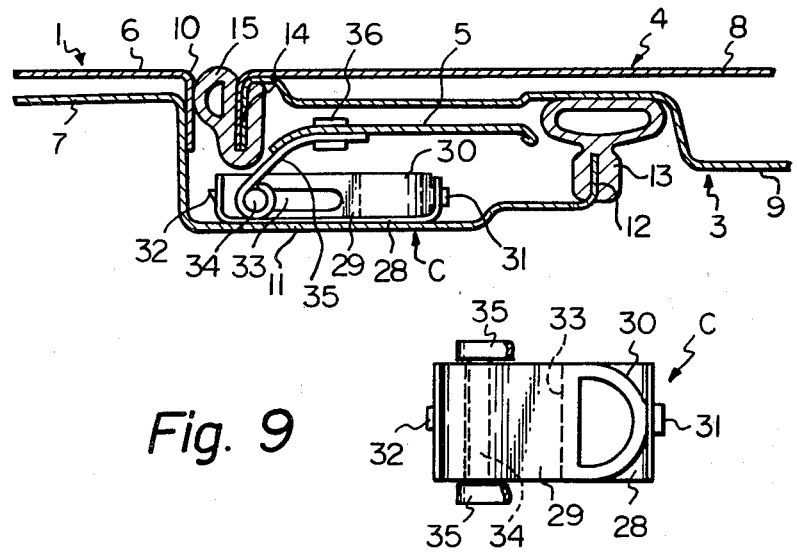
Fig. 8
Fig. 9

REMOVABLE ROOF EQUIPPED WITH A WIND DEFLECTOR PLATE

BACKGROUND OF THE INVENTION

The present invention relates to a wind deflector plate of a removable roof for use in a motor vehicle.

Motor vehicles have been known that have an opening formed in the roof and covered by a removable roof, a so-called sun roof. In such a removable roof, a wind deflector plate, projecting upwards from the roof of a motor car when the removable roof is removed is arranged at the front end of the opening to prevent ambient air from flowing into the driver's compartment at high speed through the opening. In a typical removable roof which has been proposed and is equipped with a wind deflector plate, a latch mechanism is provided for holding the front end of the removable roof and a removable roof opening and closing mechanism is also provided and is connectable to the rear end of the removable roof. However, there is a disadvantage in that it is necessary to attach the wind deflector plate onto the roof of the motor car manually after the removable roof has been removed.

OBJECT AND SUMMARY OF THE INVENTION

An object of the present invention is to provide a removable roof device equipped with a wind deflector plate which automatically stands up when the removable roof is removed.

According to the present invention, a removable roof device is mounted on the stationary roof of a motor vehicle at a position above an opening and has a contour shape that corresponds to that of the opening. Means are provided for securing the front end of the removable roof to the stationary roof, and additional means are arranged on the stationary roof to secure the rear end of the removable roof to the stationary roof. The means securing the front end include at least one tongue member on the front end of the removable roof and extending substantially horizontally forward. At least one hollow case is located on the stationary roof adjacent the front end of the removable roof and having a hole to receive the tongue member, and at least one link member rotatable from a substantially horizontal position to a standing position is located beneath the front end of the removable roof. The link has first and second ends, the second end being rotatably connected to the stationary roof. The removable roof also has a latch groove engageable with the first end of the link member when the link member is in its horizontal position. A wind deflector plate that automatically stands up is arranged on the stationary roof beneath the front end of the removable roof and connected to the link member to move from a substantially horizontal position beneath the removable roof to a standing position in which it projects upwards from the stationary roof.

The present invention may be more fully understood from the description of a preferred embodiment of the invention set forth below, together with the accompanying drawings.

BRIEF DESCRIPTION OF THE DRAWINGS

FIG. 6 is a cross-sectional side view taken along the line VI—VI in FIG. 4;

FIG. 7 is a cross-sectional side view taken along the line VII—VII in FIG. 4;

FIG. 8 is a cross-sectional side view taken along the line VIII—VIII in FIG. 4;

FIG. 9 is a plan view of the wind deflector plate supporting mechanism.

DESCRIPTION OF A PREFERRED EMBODIMENT

Figure 1:
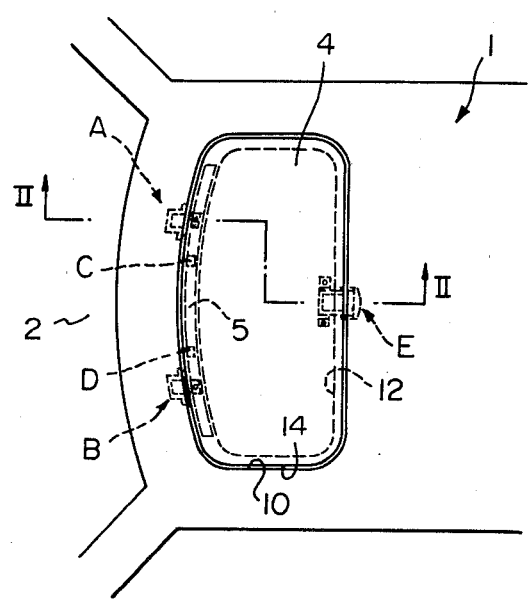
FIG. 1 is a plan view of the roof of a motor vehicle.
Figure 2:
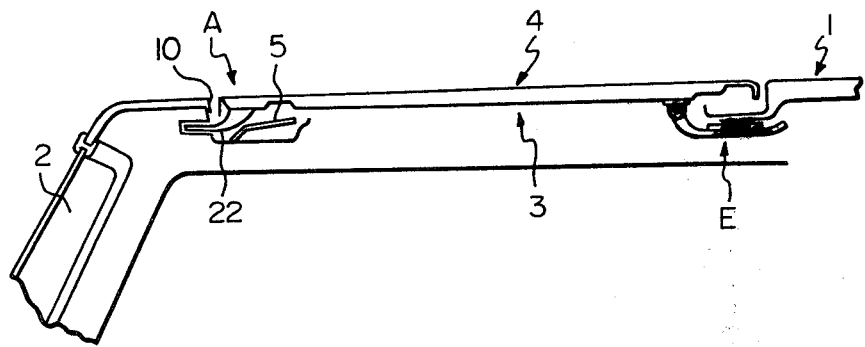
FIG. 2 is a cross-sectional side view taken along the line II—II in FIG. 1, showing the removabl roof completely closed.

FIGS. 1 and 2 show part of a stationary roof 1, a windshield 2, an opening 3 in the stationary part of the roof 1, and a removable roof 4 arranged to cover the opening 3. A wind deflector plate 5 i arranged beneath the front end of the removable roof 4. A pair of latch mechanisms A, B and a pair of wind deflector plate supporting mechanisms C, D are provided at the front end of the removable roof 4, and a mechanism E is provided at the rear end of the removable roof 4 to open and close it. The removable roof 4 is secured to the stationary roof 1 by means of the latch mechanisms A, B and the opening and closing mechanism E.

FIGS. 4 through 8 illustrate an enlarged view of the latch mechanism A and the wind deflector plate supporting mechanism C. Since the latch mechanisms A and B are symmetrical with respect to the longitudinal axis of a motor vehicle and the wind deflector plate supporting mechanisms C and D are similarly symmetrical. Therefore, the illustrations of the latch mechanism B and the wind deflector plate supporting mechanism D are omitted. FIGS. 4 through 8 show a stationary roof outer panel 6, a stationary roof inner panel 7, a removable roof outer panel 8, and a removable roof inner panel 9. The outer panel 6 has a substantially vertically extending step portion 10 forming a frame for receiving the removable roof 4 and, in addition, the outer panel 6 has an annular inner circumferential portion 11 projecting from the lower end of the step portion 10. The inner portion 11 circumferentially extends along the entire step portion 10 substantially horizontally towards the central portion of the opening 3. Weather stripping 13, made of a resilient material, is attached to a vertically extending inner end 12 of the inner circumferential portion 11. This weather stripping 13 defines the opening 3. Other resilient weather stripping 15 is attached to the vertically extending outer ends 14 of the removable roof outer panel 8 and the removable roof inner panel 9.

Figure 4:
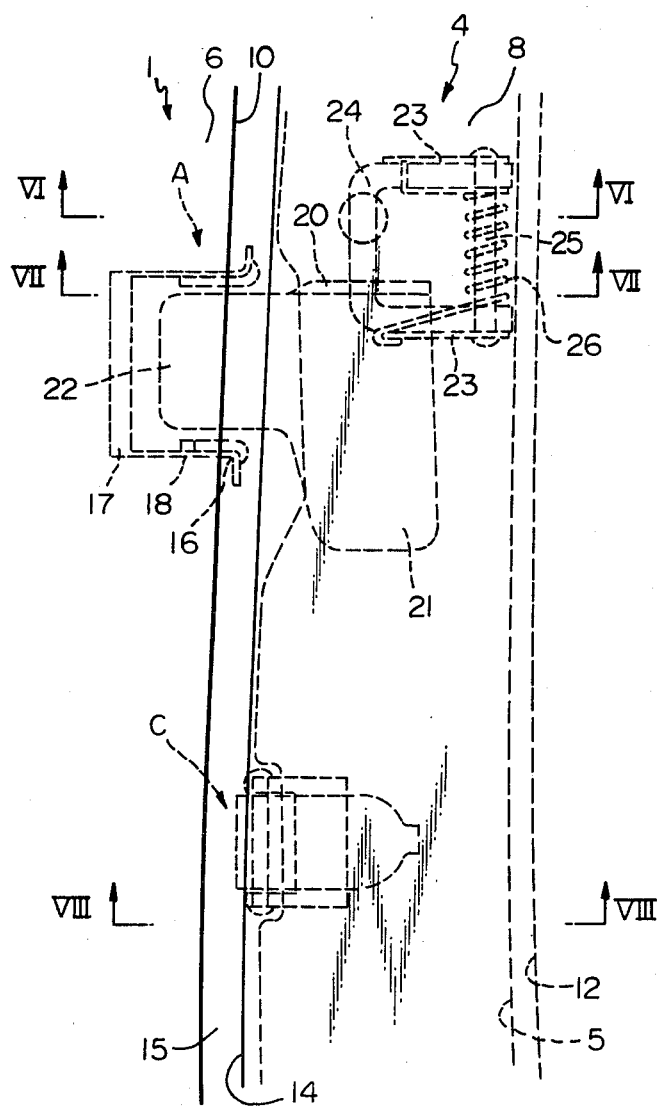
FIG. 4 is an enlarged plan view of a portion of the roof of a motor vehicle.
Figure 5:
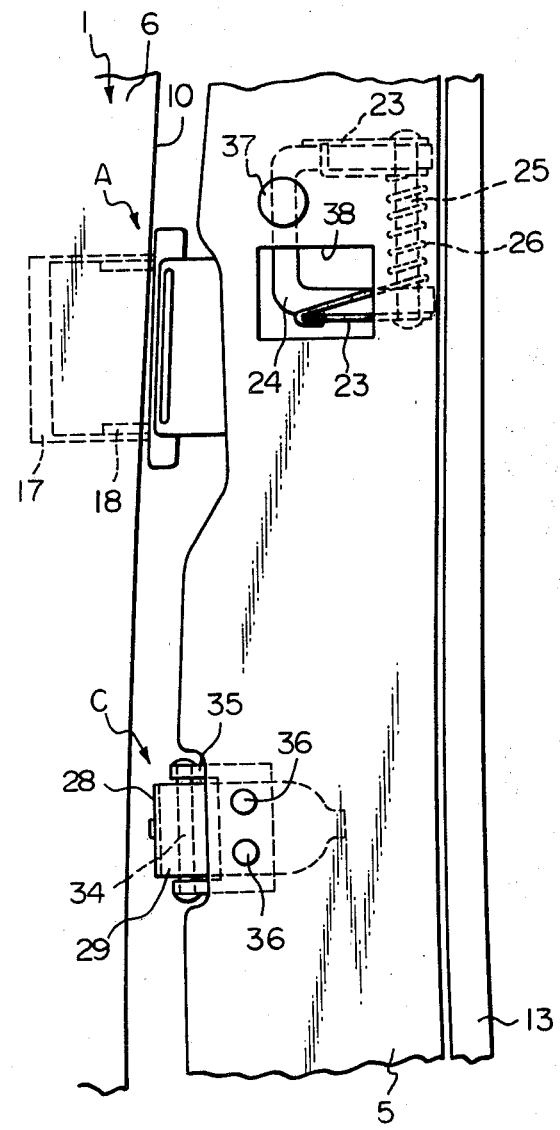
FIG. 5 is an enlarged plan view illustrating the same portion as that of FIG. 4 with the removable roof removed.

As illustrated in FIGS. 4, 5 and 7, an aperture 16, having a rectangular cross-section, is formed in the step portion 10, and a hollow case 17 is inserted into the aperture 16 and affixed to the step portion 10. A hollow sleeve 18, made of synthetic resin, is inserted into the hollow case 17. From FIG. 7, it will be understood that the size of the hole, formed in the hollow sleeve 18, is smallest at the central portion 19 of the hollow sleeve 18 and is gradually increased forwards and backwards from the central portion 19. A bracket 21 having a vertically extending flange 20 formed as an integral part is attached to the lower wall of the removable roof inner panel 9, and a tongue member 22 that extends substantially horizontally forward from the bracket 21 is formed as an integral part of the bracket 21. In addition, a bracket 23 is attached to the upper wall of the inner circumferential portion 11 to the rear of the hollow sleeve 18, and a U-shaped movable link 24 is pivotally connected to the bracket 23 by means of a pivot pin 25. A coil spring 26 encircles the pivot pin 25 to bias the movable link 24 in the clockwise direction in FIG. 7. In addition, a latch groove 27, which is engageable with the movable link 24, is formed on the flange 20 of the bracket 21.

As illustrated in FIGS. 4, 5, 8 and 9, the wind deflector plate supporting mechanism C comprises a bracket 28 attached to the upper surface of the inner circumferential portion 11, and a support body 29 mounted on the bracket 28 and made of synthetic resin. The support body 29 has a resilient annular leg portion 30 and a pair of projections 31 and 32. The support body 29 is attached to the bracket 28 by fitting the projections 31, 32 into bores in the bracket 28. The support body 29 has a horizontally extending slot 33 therein, and a pin 34 is slidably inserted into the slot 33. The lower end of an arm 35 encircles opposite ends of the pin 34, and the wind deflector plate 5 is attached to the upper end of the arm 35 by means of a pair of rivets 36. As illustrated in FIGS. 5 and 6, a snap member 37 attached to the central portion of the wind deflector plate 5 removably and pivotally connects the the wind deflector plate to the movable link 24. As illustrated in FIGS. 4, 5 and 7, a portion of the wind deflector plate 5, which is located beneath the bracket 21, is bent downwards relative to the remaining portion of the wind deflector plate 5 to prevent the wind deflector plate 5 from interfacing with the flange 20 of the bracket 21, and an aperture 38 is formed in the wind deflector plate 5 at a position near the movable link 24 so that the movable link 24 can be engaged with the latch groove 27 of the bracket 21.

Figure 13:
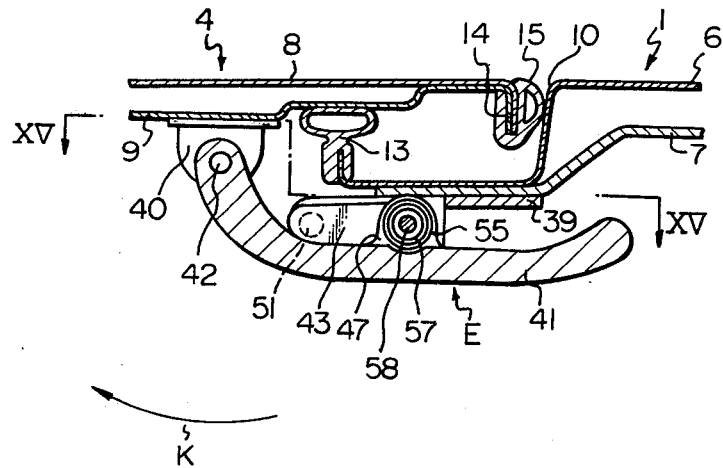
FIG. 13 is a cross-sectional side view of the removable roof opening and closing mechanism illustrated in FIG. 1, taken along the line XIII—XIII in FIG. 15.
Figure 14:
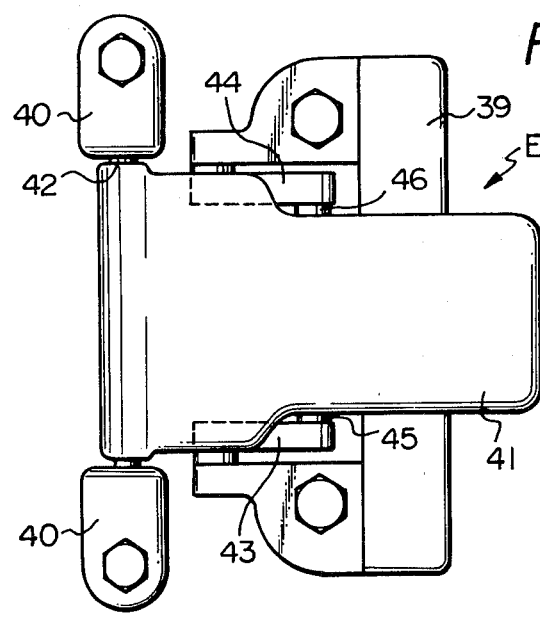
FIG. 14 is a bottom view of FIG. 13.
Figure 15:
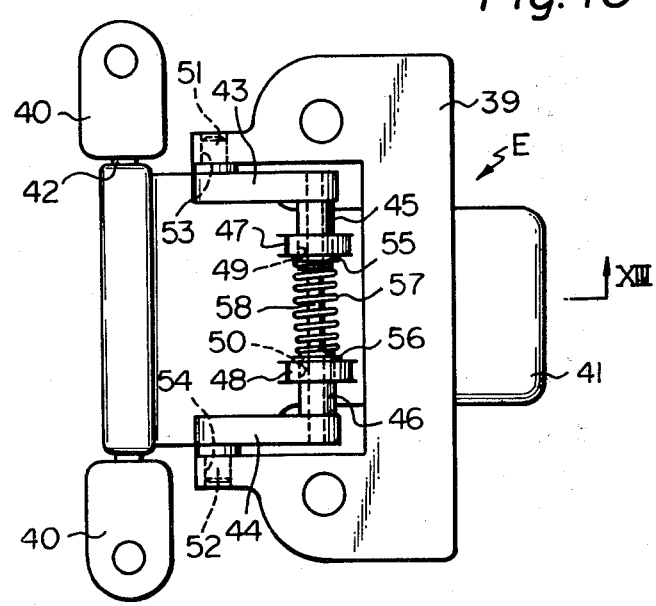
FIG. 15 is a plan view taken along the line XV—XV in FIG. 13.

FIGS. 13 through 15 illustrate enlarged views of the removable roof opening and closing mechanism E in which a base 39 is attached to the lower face of the stationary roof inner panel 7, a pair of brackets attached to the lower face of the removable roof inner panel 9, and a handle member 41 is pivotally connected to the brackets 40 by means of a pivot pin 42. The rear ends of a pair of designate link members 43 and 44 have cylindrical portions 45 and 46, respectively, formed integrally thereon to slide into a pair of brackets 47 and 48 formed integrally with the handle member 41. The brackets 47 and 48 have bores 49 and 50, respectively, into which the cylindrical portions 45 and 46 of the link members 43 and 44 are rotatably inserted. In addition, cylindrical projections 51 and 52 are integrally formed on the front ends of the link members 43 and 44, respectively, and are rotatably and removably inserted in bores 53 and 54 formed on the base 39. Rings 55 and 56 are secured onto the inner ends of the cylindrical portions 45 and 46 of the link members 43 and 44, respectively, and a compression spring 57 is inserted between the rings 55 and 56. A rod 58 that extends into the cylindrical portions 45 and 46 of the link members 43 and 44 has one end affixed to the cylindrical portion 45 of the link member 43, and the other end slidably inserted into the cylindrical portion 46 of the link member 44.

FIGS. 7, 8 and 13 illustrate the latch mechanism A, the wind deflector plate supporting mechanism C and the removable roof opening and closing mechanism E, respectively, in the case wherein the opening 3 is completely closed by the removable roof 4 as illustrated in FIG. 2. In this case, as illustrated in FIG. 7, the tongue member 22 is inserted into the deep interior of the hollow case 17, and the U-shaped movable link 24 is in a substantially horizontal position in engagement with the latch groove 27 of the bracket 21. In addition, as illustrated in FIG. 8, the pin 34 of the arm 35 is positioned at its forwardmost position within the slot 33 of the support body 29, and the wind deflector plate 5 is in a substantially horizontal position. Furthermore, as illustrated in FIGS. 7 and 8, the wind deflector plate 5 is supported by only the movable link 24 and the pin 34 and is not in contact with the removable roof inner panel 9.

Figure 3:
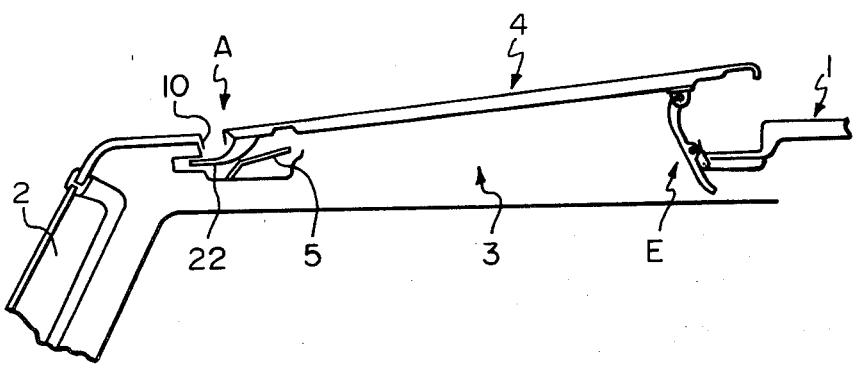
FIG. 3 is a cross-sectional side view taken along the line II—II in FIG. 1, showing the removable roof partially opened.
Figure 10:
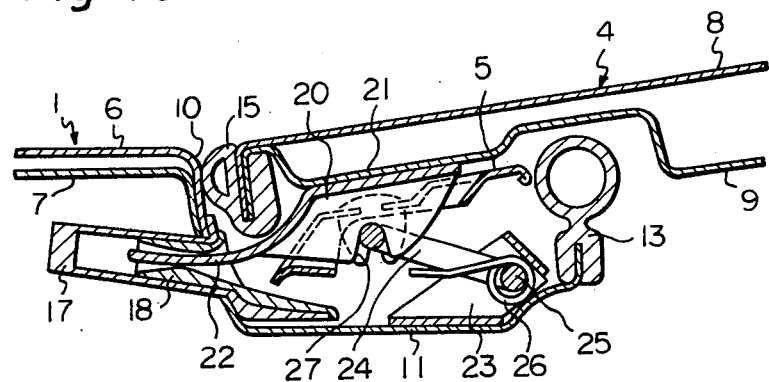
FIG. 10 is a cross-sectional side view illustrating the same cross-section as that of FIG. 7 and showing the removable roof partially opened.
Figure 16:
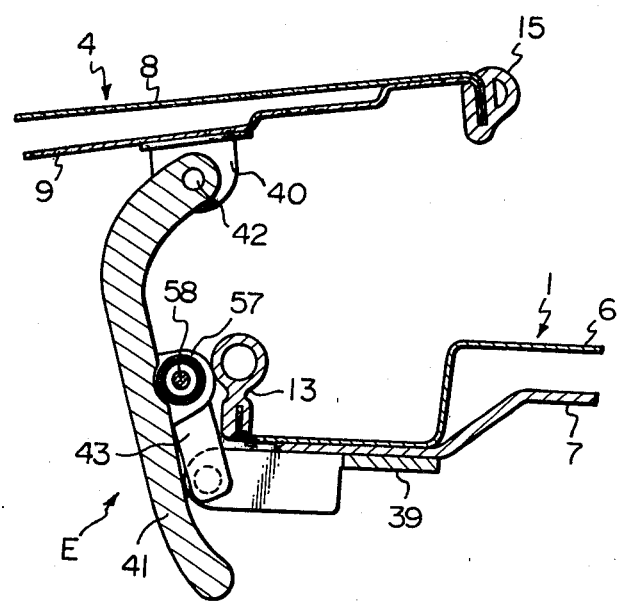
FIG. 16 is a cross-sectional side view illustrating the same cross-section as that of FIG. 13 and illustrating the case wherein the removable roof is partially opened.

When the handle member 41 is manually rotated in the direction illustrated by the arrow K in FIG. 13 and moved to a position illustrated in FIG. 16, the removable roof 4 is partially opened, as illustrated in FIG. 3, with the rear end of the removable roof 4 pivoted upwards, as illustrated in FIG. 10, and the movable link 24 rotated slightly clockwise due to the spring force of the coil spring 26 while engagement between the movable link 24 and the latch groove 27 is maintained. At this time, the tongue member 22 is pulled slightly out of the hollow case 17 which allows the wind deflector plate 5 to pivot slightly upward.

Figure 11:
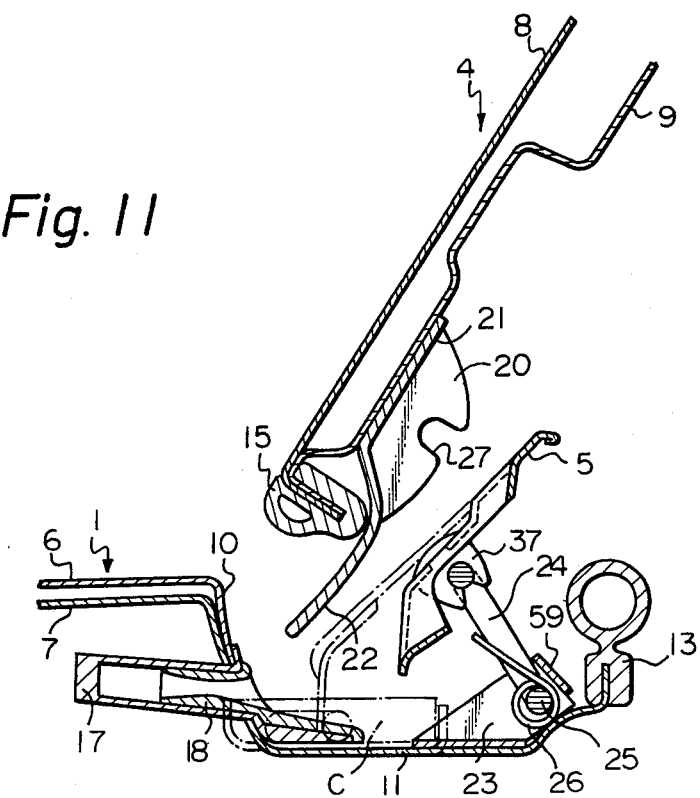
FIG. 11 is a cross-sectional side view illustrating the same cross-section as that of FIG. 7 and illustrating the moment when the removable roof is removed.
Figure 12:
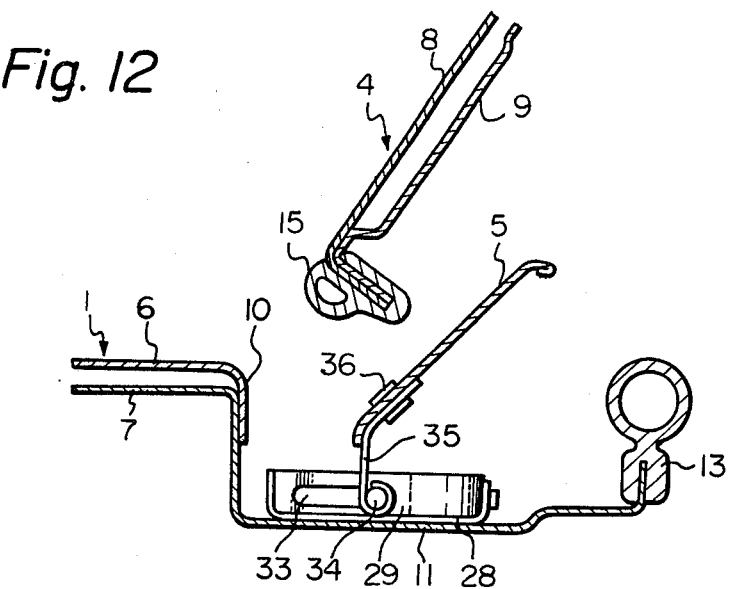
FIG. 12 is a cross-sectional side view illustrating the same cross-section as that of FIG. 8 and illustrating the moment when the removable roof is removed.

In FIG. 15, if the link members 43 and 44 are manually pressed inwards against the spring force of the compression spring 57, the cylindrical projections 51, 52 of the link members 43, 44 are pulled out of the bores 53, 54 of the base 39, thereby detaching the handle member 41 and the link members 43, 44 from the base 39. After this, when the rear end of the removable roof 4 is manually lifted to a position which is higher than that illustrated in FIG. 16, the movable link 24 is disengaged from the latch groove 27. Then, as illustrated in FIG. 11, the tongue member 22 can be completely pulled out of the hollow case 17 to allow the removable roof 4 to be removed from the stationary roof 1. During the time the rear end of the removable roof 4 is lifted to a position which is longer than that illustrated in FIG. 16, the movable link 24 gradually rotates in the clockwise direction from the position shown in FIG. 10. At this time, since the wind deflector plate 5 is pulled backwards by the movable link 24, the pin 34 (FIG. 8) gradually moves backwards within the slot 33 from the position illustrated in FIG. 8. When the removable roof 4 is removed from the stationary roof 1, the force of the coil spring 26 causes the movable link 24 to come into engagement with a stop 59 (FIG. 11) formed on the bracket 23 and, thus, the movable link 24 is maintained in a standing position, as illustrated in FIG. 11. When the movable link 24 is in a standing position, the pin 34 moves to its rearwardmost position within the slot 33 of the support body 29 as illustrated in FIG. 12. As a result of this, as illustrated in FIGS. 11 and 12, the wind deflector plate 5 up and projects from the stationary roof 1.

When the removable roof 4 is to be attached to the stationary roof 1, the tip of the tongue member 22 is inserted into the hollow case 17. After this, the latch groove 27 of the bracket 21 is engaged with the movable link 24 and then the rear end of the removable roof 4 is pulled down. When the removable roof 4 is attached to the stationary roof 1, the wind reflector plate 5 is completely covered by the removable roof 4.

According to the present invention, when the removable roof 4 is removed from the stationary roof 1, the wind deflector plate 5 automatically stands up. Consequently, it is not necessary to attach a wind deflector plate onto the roof of a motor car manually as in the prior art. In addition, when the opening and closing operation of the removable roof 4 is carried out, there is no possibility that the removable roof 4 will come into engagement with the wind deflector plate 5. Therefore, there is no danger that the wind deflector plate 5 will be damaged by the removable roof 4.

While the invention has been described by reference to a specific embodiment chosen for purposes of illustration, it should be apparent that numerous modifications could be made thereto by those skilled in the art without departing from the spirit and scope of the invention.

We claim:

1. In a motor vehicle having a stationary roof which has a front end and a rear end and an opening intermediate the ends, the opening also having front and rear ends, and a removable roof having a contour shape which corresponds to that of the opening, said removable roof having a front end and a rear end, the invention comprising:
   first releasable means for releasably securing the front end of said removable roof to the stationary roof;
   second releasable means arranged on the stationary roof adjacent the location of the rear end of said removable roof for releasably securing the rear end of said removable roof to the stationary roof, said first releasable means comprising at least one tongue member affixed to the front end of said removable roof and extending substantially horizontally toward the front end of said stationary roof, at least one hollow case on the stationary roof in the vicinity of the front end of said removable roof and having therein an opening to receive the tongue member, and at least one link member pivotally connected to the stationary roof at a position beneath the front end of the removable roof and having a first end and a second end, the link member being rotatable between a substantially horizontal position and a standing position, said removable roof having a latch groove which is engageable with the first end of said link member when said link member is in said substantially horizontal position; and
   an automatically standing wind deflector plate pivotally mounted on said stationary roof at a position beneath the front end of said removable roof and connected to said link member, said wind deflector plate being pivotally movable by the link member from a substantially horizontal position beneath said removable roof to a standing position wherein said wind deflector plate projects upwards from said stationary roof.

2. The invention as claimed in claim 1, wherein said wind deflector plate has a front end, said invention further comprising means for supporting the front end of said wind deflector plate, said wind deflector plate being connected to said link member at a position remote from the front end of said wind deflector plate towards the rear end of said stationary roof.

3. The invention as claimed in claim 2, wherein said wind deflector plate has at least one snap member which is removably connected to said link member.

4. The invention as claimed in claim 2, wherein said supporting means comprises at least one support body affixed to said stationary roof and having a horizontally extending slot, at least one pin slidably inserted into said slot, and at least one arm interconnecting said pin to the front end of said wind deflector plate.

5. The invention as claimed in claim 4, wherein said stationary roof has an inner circumferential portion extending along a peripheral portion of said removable roof at a position beneath said removable roof, said support body being fixed onto said inner circumferential portion.

6. The invention as claimed in claim 4, wherein said supporting means further comprises at least one bracket fixed onto said stationary roof and having bores formed thereon, said support body being removably fixed onto said bracket and having projections, each being engageable with the corresponding bore of said bracket.

7. The invention as claimed in claim 6, wherein said support body is made of synthetic resin and has a deformable leg portion having one of said projections.

8. The invention as claimed in claim 1, wherein the stationary roof comprises:
   a downwardly extending portion defining the opening of the stationary roof; and
   a second portion extending inwardly relative to said opening to be beneath the perimeter of the removal roof, said hollow case extending from said step portion.

9. The invention as claimed in claim 8, wherein said hollow case has a hollow sleeve inserted therein and made of synthetic resin, the hole of said hollow case being formed in said hollow sleeve and extending substantially horizontally.

10. The invention as claimed in claim 9, wherein said hollow sleeve has a central portion at which the size of said hole is minimum, the size of said hole being gradually increased towards the front end and the rear end of said stationary roof.

11. The invention as claimed in claim 8, wherein said removable roof has weather stripping affixed to a contour edge thereof and being engageable with said step portion.

12. The invention as claimed in claim 1, wherein the stationary roof has an inner circumferential portion extending along a peripheral portion of said removable roof at a position beneath said removable roof, the second end of said link member being rotatably connected to said inner circumferential portion.

13. The invention as claimed in claim 12, wherein said link member has a U-shape.

14. The invention as claimed in claim 12, comprising a spring resiliently biasing said link member from said substantially horizontal position towards said standing position.

15. The invention as claimed in claim 12, wherein said inner circumferential portion has an innr edge onto which weather stripping is attached, said weather stripping defining said opening of the stationary roof and being arranged to be engageable with a lower face of said removable roof.

16. The invention as claimed in claim 1, wherein said removable roof has a flange extending downwardly from a lower face of said removable roof and said tongue member being formed integrally with said flange, said latch groove being formed on said flange.

17. The invention as claimed in claim 1, wherein said first releasable means comprises a base affixed to a lower face of said stationary roof, at least one additional link member having first and second ends, said second end being pivotally connected to said base, and a handle member interconnecting the first end of said additional link member to the rear end of said removable roof, said handle member being movable from a position wherein said removable roof is completely closed to a position wherein said removable roof is partially opened.

18. The invention as claimed in claim 17, wherein said base has at least one bore formed thereon, the second end of said link member having a projection which is engageable with said bore, the first end of said link member being spring-loaded for biasing said link member towards said bore to maintain the engagement relationship between said projection and said bore.

* * * * *